US005576788A

United States Patent [19]
Miyazawa et al.

[11] Patent Number: 5,576,788
[45] Date of Patent: Nov. 19, 1996

[54] CAMERA SHAKE AMOUNT DISPLAY APPARATUS FOR CAMERA

[75] Inventors: Azuma Miyazawa; Yuji Imai; Hisayuki Matsumoto; Hideto Kitazawa; Yoshinori Matsuzawa, all of Tokyo; Juro Kikuchi, Yamanashi-ken, all of Japan

[73] Assignee: Olympus Optical Co., Ltd., Tokyo, Japan

[21] Appl. No.: 229,461

[22] Filed: Apr. 18, 1994

[30] Foreign Application Priority Data

Apr. 21, 1993 [JP] Japan ................................ 5-094553

[51] Int. Cl.⁶ .............................. G03B 17/18; G03B 17/00
[52] U.S. Cl. ............................ 396/52; 396/281; 396/263
[58] Field of Search ........................................ 354/202, 432, 354/289.12, 400, 410, 430, 70, 474, 475, 472

[56] References Cited

U.S. PATENT DOCUMENTS

| 4,618,238 | 10/1986 | Maitani et al. | 354/431 |
| 5,109,249 | 4/1992 | Kitajima | 354/430 |
| 5,130,733 | 7/1992 | Taniguchi et al. | 354/400 |
| 5,204,709 | 4/1993 | Sato | 354/266 |
| 5,235,379 | 8/1993 | Katoh et al. | 354/443 |
| 5,237,365 | 8/1993 | Miyazawa | 354/456 |
| 5,266,981 | 11/1993 | Hamada et al. | 354/400 |

FOREIGN PATENT DOCUMENTS

| 58-83831 | 5/1983 | Japan . |
| 61-141423 | 6/1986 | Japan . |
| 2-126250 | 5/1990 | Japan . |
| 3-273221 | 12/1991 | Japan . |

Primary Examiner—Howard B. Blankenship
Assistant Examiner—Christopher E. Mahoney
Attorney, Agent, or Firm—Frishauf, Holtz, Goodman, Langer & Chick

[57] ABSTRACT

A camera which reduces camera shake by adjusting the shutter timing is characterized in that it has a mode for displaying a camera shake amount to allow a photographer to recognize a camera shake. A shutter timing determining section permits shutter release at a timing at which the camera shake amount becomes a predetermined amount or less during a shutter release operation on the basis of the camera shake amount detected by a camera shake detecting section. When a camera shake learning mode is set through an input section, a camera shake amount is converted into a display amount by a display data converting section through a camera shake mode selecting section. This display amount is displayed on a display section in real time while a shutter release button is depressed. The camera shake selecting section inhibits a shutter driving operation of the shutter timing determining section in the camera shake amount display mode, thus also allowing a photographer to learn how to depress the shutter release button without causing a camera shake.

4 Claims, 8 Drawing Sheets

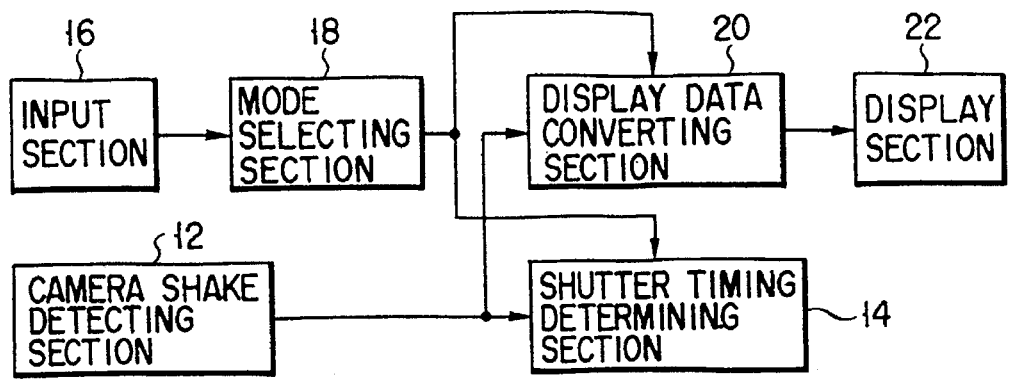
F I G. 1
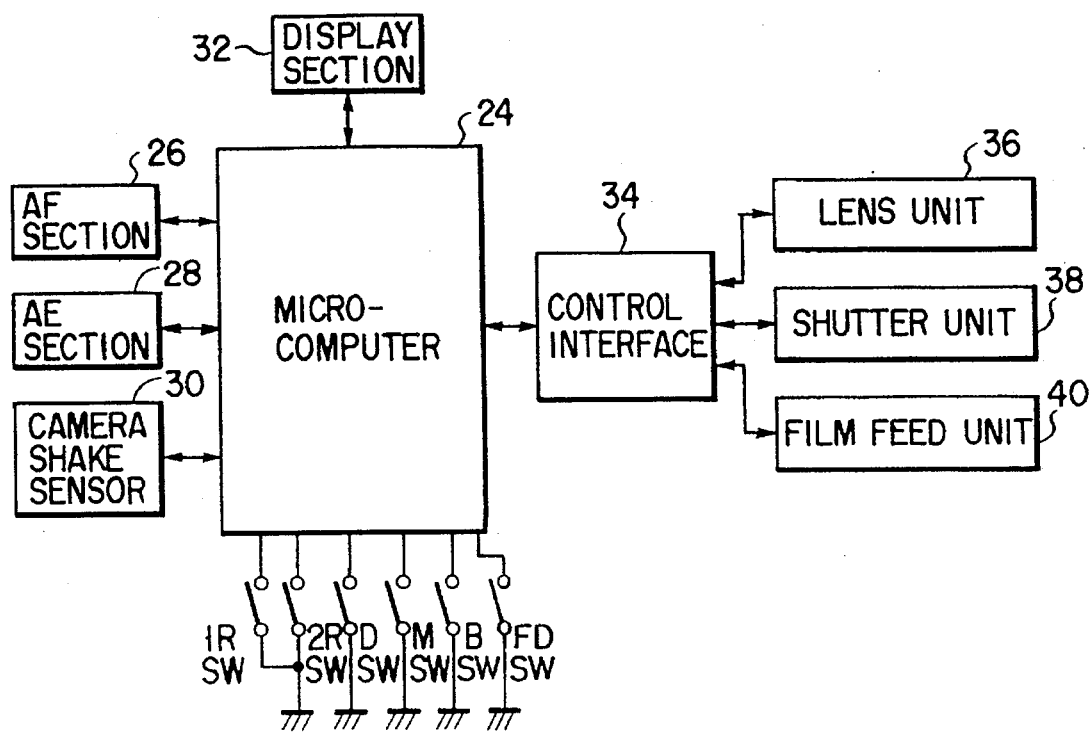
F I G. 2

32a

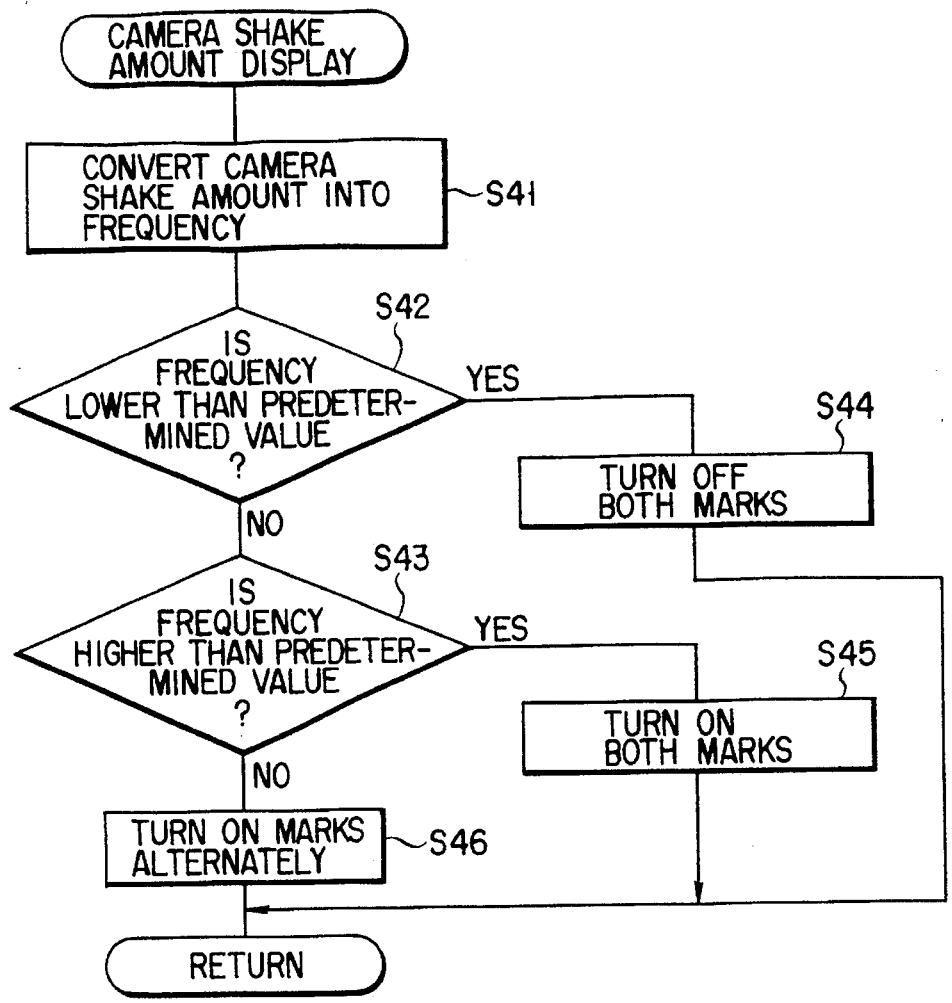
FIG. 11
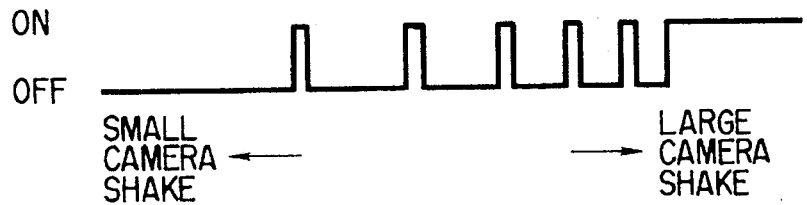

CAMERA SHAKE AMOUNT DISPLAY APPARATUS FOR CAMERA

BACKGROUND OF THE INVENTION

1. Field of the Invention

The present invention relates to a camera shake amount display apparatus for a camera and, more particularly, to a camera shake amount display apparatus for a camera, which reduces the frequency of occurrence of photography accompanying a camera shake by a photographer.

2. Description of the Related Art

Various photographing apparatuses and the like for detecting the shake of a photographing apparatus such as a camera to reduce the shake have been proposed.

For example, Jpn. Pat. Appln. KOKAI Publication No. 3-273221 discloses a camera designed to predict a camera shake amount in an exposure operation from an image blur peak value so as to perform photography upon shifting the exposure interval when the camera shake amount exceeds an allowable value.

Although such a camera can perform photography while preventing photography accompanying a camera shake, photography must be performed with the exposure interval being shifted on the camera side. For this reason, the influence of a camera shake on a printed photograph can be reduced, but there is no means for informing the photographer of the actual camera shake amount. Therefore, it is difficult for the photographer to perform photography accompanying no camera shake.

SUMMARY OF THE INVENTION

It is, therefore, an object of the present invention to provide a camera shake amount display apparatus for a camera, which informs a photographer of a camera shake amount so as to urge the photographer to reduce the frequency of occurrence of photography accompanying a camera shake.

It is, therefore, an object of the present invention to provide a camera shake amount display apparatus for a camera, comprising: camera shake detecting means for detecting a camera shake amount of the camera; shutter timing determining means for determining a shutter release timing on the basis of an output from the camera shake detecting means; mode input means for inputting a camera shake learning mode; display data converting means for converting the camera shake amount detected by the camera shake detecting means into display data when the camera shake learning mode is selected by the mode input means; and display means for displaying the display data obtained by the display data converting means.

It is another object of the present invention to provide a camera shake display apparatus for a camera, comprising: camera shake detecting means for detecting a camera shake amount of the camera; mode setting means for setting at least a camera shake display mode; control means for receiving outputs from the camera shake detecting means and the mode setting means, and converting the camera shake amount detected by the camera shake detecting means into display data and outputting the display data when the camera shake display mode is selected by the mode setting means; and display means for receiving the display data output from the control means and displaying the camera shake amount.

It is still another object of the present invention to provide a camera comprising: detecting means for detecting a camera shake amount of the camera; display means for displaying a camera shake state on the basis of the camera shake amount detected by the detecting means; and display selecting means for inhibiting or allowing a display operation of the display means.

It is still another object of the present invention to provide a camera comprising: camera shake detecting means for detecting a camera shake amount of the camera; camera shake reducing means for performing a camera shake reducing operation on the basis of the camera shake amount; switching means for performing a switching operation with regard to whether to operate the camera shake reducing means; and camera shake display means for changing a display state in accordance with the camera shake amount detected by the camera shake detecting means when the camera shake reducing means is in an operative state, and inhibiting a change in the display state when the camera shake reducing operation is in an inoperative state.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a block diagram showing the concept of a camera shake amount display apparatus for a camera according to the present invention;

FIG. 2 is a schematic block diagram of a camera to which the camera shake amount display apparatus for a camera of the present invention is applied;

FIG. 11 is a flow chart for explaining a display operation in a case wherein marks $32c_1$ and $32c_2$ in FIG. 5C are used;

FIGS. 12A and 12B are timing charts showing the ON timings of the marks $32c_1$ and $32c_2$.

DETAILED DESCRIPTION OF THE PREFERRED EMBODIMENTS

Figure 3:
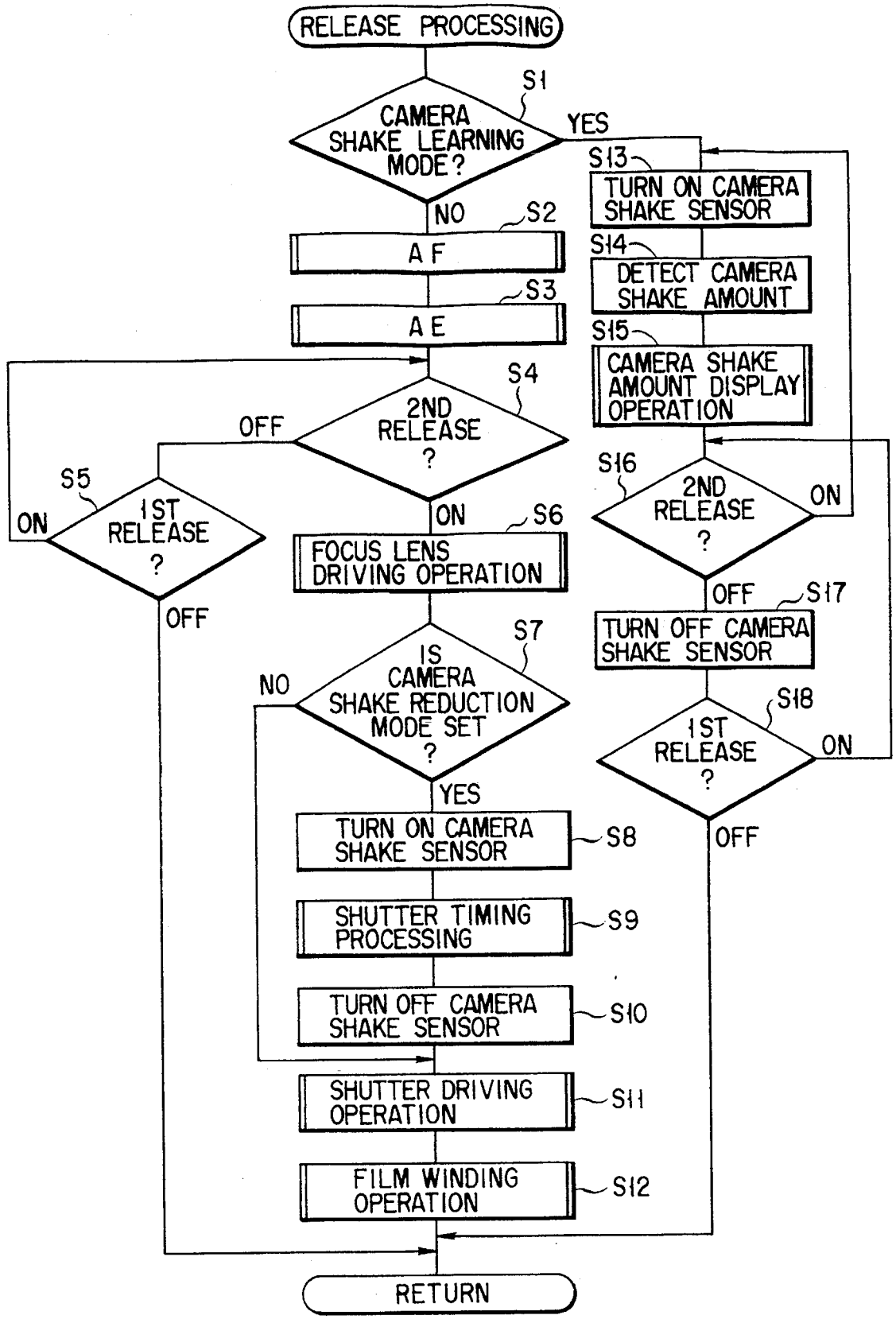
FIG. 3 is a flow chart for explaining an operation to be performed when a shutter release button is depressed.

An embodiment of the present invention will be described below with reference to the accompanying drawings.

FIG. 1 is a block diagram showing the concept of a camera shake amount display apparatus for a camera according of the present invention. Referring to FIG. 1, a camera shake amount detected by a camera shake detecting section 12 is supplied to a shutter timing determining section 14. A signal from an input section 16 is input to the shutter timing determining section 14 through a mode selecting section 18. The mode selecting section 18 is a means for determining whether to set the camera in a camera shake learning mode. A mode switching operation is performed by the input section 16. A display data converting section 20 converts the camera shake amount obtained by the camera shake detecting section 12 into a display amount and outputs it to a display section 22 in accordance with a signal from the mode selecting section 18.

In this arrangement, a camera shake amount is detected by the camera shake detecting section 12 in a normal photographic operation. On the basis of the camera shake amount detected by the camera shake detecting section 12, the shutter timing determining section 14 allows shutter release at a timing at which the camera shake amount becomes a predetermined amount or less during a shutter release operation.

If the camera shake learning mode is set by the input section 16, the camera shake amount is converted into a display amount by the display data converting section 20 through the mode selecting section 18. This display amount is then displayed by the display section 22.

In the camera shake learning mode, the operation of the shutter timing determining section 14 may be inhibited to inhibit shutter release.

FIG. 2 is a schematic block diagram of a camera to which the camera shake amount display apparatus of the present invention is applied. Various control operations of this camera are performed by a microcomputer 24. An AF section 26, an AE section 28, a camera shake sensor 30, and a display section 32 are connected to the microcomputer 24. The AF section 26 serves to measure the distance to an object to be photographed. The AE section 28 measures the brightness of the object. The camera shake sensor 30 detects a signal corresponding to a camera shake. The display section 32 comprises an LED, an LCD, or the like.

As the camera shake sensor 30, for example, one of the following sensors may be used: an angular velocity sensor, a sensor designed to detect the relative positions of a camera and the face of a photographer, disclosed in Jpn. Pat. Appln. KOKAI Publication No. 4-149634 filed by the present applicant, and a TTL type AF sensor.

A lens unit 36, a shutter unit 38, and a film feed unit 40 are connected to the microcomputer 24 through a control interface 34 incorporating, for example, a driver circuit for controlling a large current to be supplied to a motor and the like. The lens unit 36 serves to form an image on a film surface. The shutter unit 38 serves to perform an exposure operation with respect to a film. The film feed unit 40 serves to perform a film winding/rewinding operation.

In addition, a first release switch 1RSW, a second release switch 2RSW, a display permission/inhibition switch DSW, a camera shake learning mode switch MSW, a film presence detecting switch FDSW, and a switch BSW are connected to the microcomputer 24. The second release switch 2RSW is turned on when the shutter release button is depressed further after the first release switch 1RSW is turned on. The switch BSW serves to select a camera shake reduction mode.

Referring to FIG. 2, each block shows only a portion associated with the present invention.

An operation to be performed when the shutter release button is depressed will be described next with reference to the flow chart in FIG. 3.

In step S1, it is determined whether the camera shake learning mode is set. The camera shake learning mode is switched by the camera shake learning mode switch MSW. If NO in step S1, AF and AE operations are respectively performed in steps S2 and S3. Thereafter, in step S4, it is checked whether a second release operation is performed.

If the second release switch 2RSW is OFF, the flow advances to step S5 to check whether a first release operation is performed. If the first release switch 1RSW is OFF, the processing is terminated. If it is determined in step S5 that the first release switch 1RSW is ON, the flow returns to step S4 to wait until the second release switch 2RSW is turned on in steps S4 and S5.

If it is determined in step S4 that the second release switch 2RSW is ON, the flow advances to step S6 to drive a focus lens to perform a focusing operation. In step S7, it is checked whether the camera shake reduction mode is set. If NO in step S7, the flow advances to step S11. If YES in step S7, the camera shake sensor 30 is turned on in step S8. In step S9, shutter timing processing is performed. See FIG. 13 and the description hereinbelow for details of shutter timing processing. At a timing at which no camera shake occurs (as determined in the shutter timing processing in step S9), the camera shake sensor 30 is turned off in step S10. In step S11, a shutter driving operation is performed by the shutter unit 38. In step S12, the film is wound up, and the processing is terminated.

If it is determined in step S1 that the camera shake learning mode is set, the flow advances to step S13 to turn on the camera shake sensor 30. In step S14, a camera shake amount is detected. In step S15, the camera shake amount is displayed on the display section 32. In step S16, it is checked whether a second release operation is performed. The above processing in steps S13 to S16 is repeated while the second release switch 2RSW is turned on. As a result, a camera shake amount can be displayed in real time.

If it is determined in step S16 that the second release switch 2RSW is OFF, the camera shake sensor 30 is turned off in step S17. In step S18, the flow waits until the first release switch 1RSW is turned off. If it is determined in step S18 that the first release switch 1RSW is ON, the flow then returns to step S16. When the second release switch 2RSW is turned on, a camera shake display operation is performed again.

According to this embodiment, in the camera shake learning mode, AF, AE lens driving operations, a shutter driving operation, and the like are not performed. However, operations other than a shutter driving operation and a film winding operation may be performed in this mode.

Another operation to be performed when the shutter release button is depressed will be described next with reference to the flow chart in FIG. 4. Since the flow chart in FIG. 4 is almost the same as that in FIG. 3, only different steps will be described below.

Figure 4:
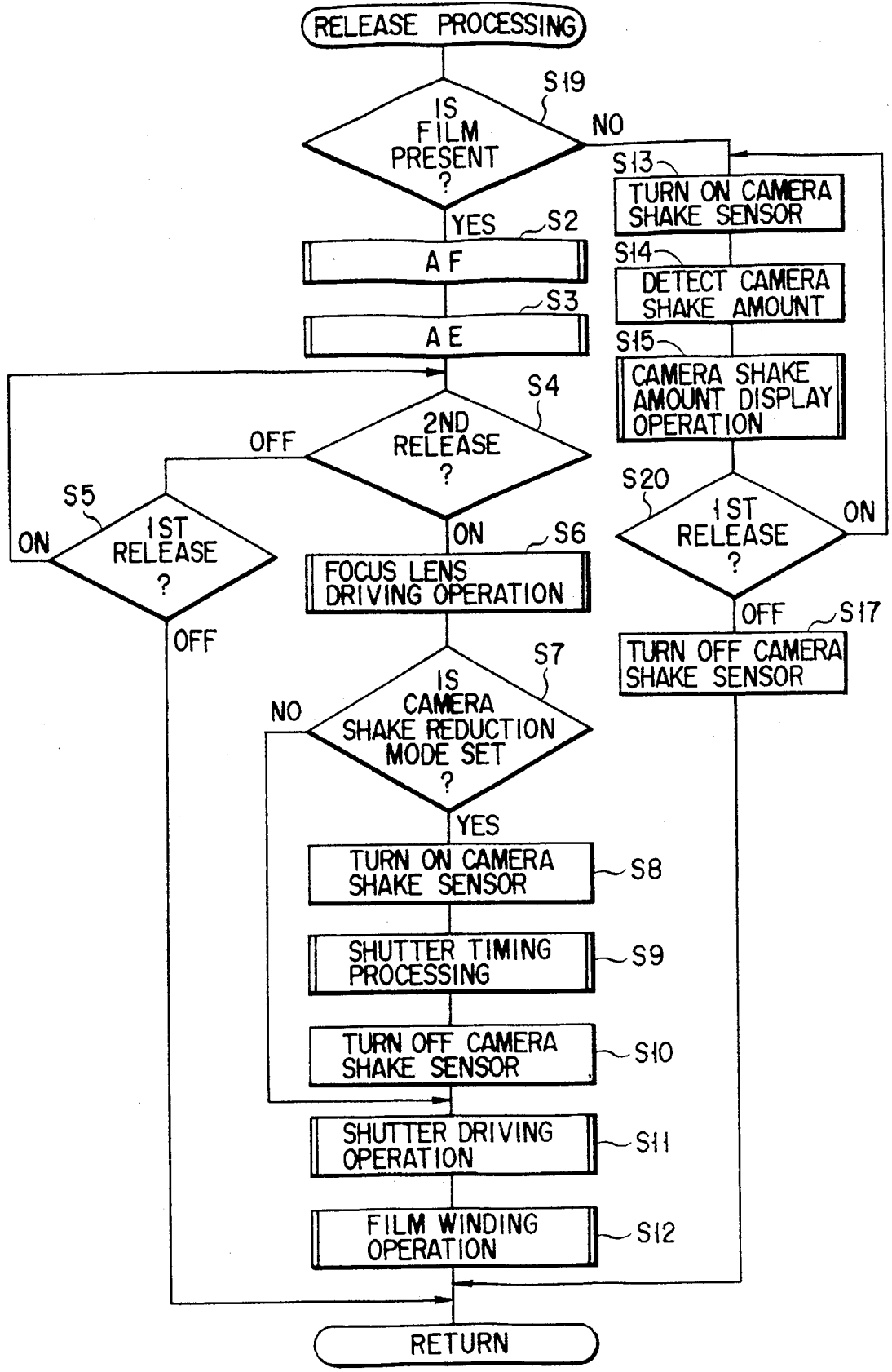
FIG. 4 is a flow chart for explaining another operation to be performed when the shutter release button is depressed.

Instead of step S1 in FIG. 3, step S19 is performed, in which it is checked on the basis of the presence/absence of a film whether the camera shake learning mode is set. Instead of steps S16 and S18, step S20 is performed, in which a display operation in the camera shake learning mode is performed while the first release switch 1RSW is ON, regardless of the state of the second release switch 2RSW. Since the remaining steps are the same as those in the flow chart in FIG. 3, a description thereof will be omitted.

Figure 5A:
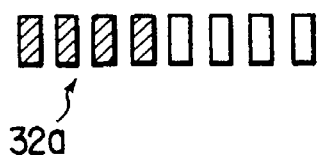
FIGS. 5A through 5C are views showing examples of how a camera shake amount is displayed on a display section.
Figure 5B:
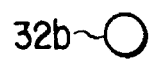
Figure 5C:
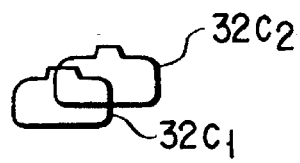

FIGS. 5A through 5C show examples of how a camera shake amount is displayed on the display section 32.

FIG. 5A shows a case wherein LEDs or LCDs 32a are arranged in the form of a belt. In this arrangement, as the camera shake amount increases, the length of the displayed belt increases. FIG. 5B shows a case wherein a camera shake amount is displayed with only one LED 32b. FIG. 5C shows a case wherein marks $32c_1$ and $32c_2$, each having the shape of a camera, are alternately turned on. Note that LEDs or LCDs may be used as the marks $32c_1$ and $32c_2$.

The displays shown in FIGS. 5A through 5C are preferably arranged inside the finder of the camera.

Figure 6:
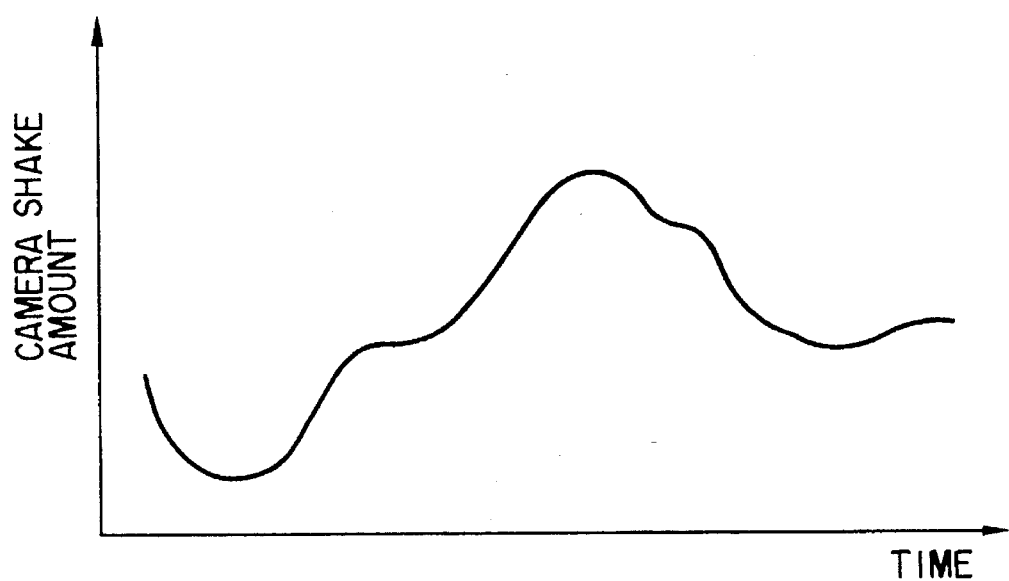
FIG. 6 is a graph showing a typical example of a change in camera shake amount output from a camera shake sensor over time.

FIG. 6 shows an example of a typical change in camera shake amount output from the camera shake sensor 30 over time. Referring to FIG. 6, the abscissa represents the elapsed time; and the ordinate, the camera shake amount.

Figure 7:
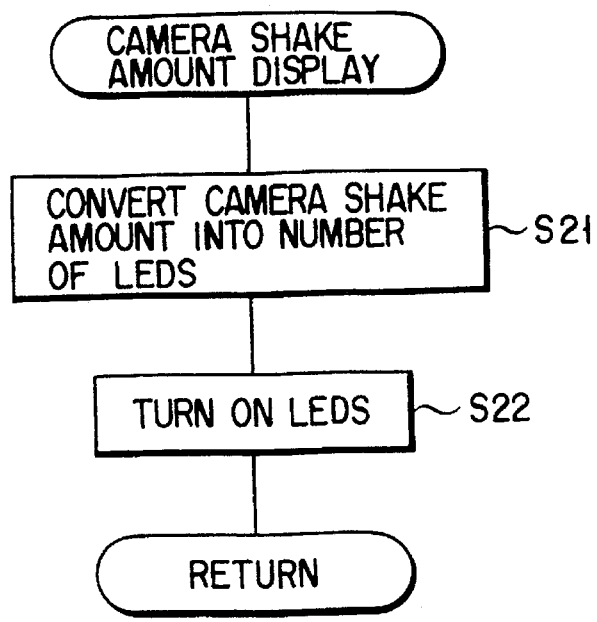
FIG. 7 is a flow chart for explaining a camera shake amount display operation in a case wherein the LEDs shown in FIG. 5A are used.

FIG. 7 is a flow chart for explaining a camera shake amount display operation to be performed when the LEDs 32a shown in FIG. 5A are used. This operation will be described below.

In step S21, conversion of a camera shake amount is performed in accordance with the number of LEDs. With this operation, an LED display is performed in step S22.

Figure 8:
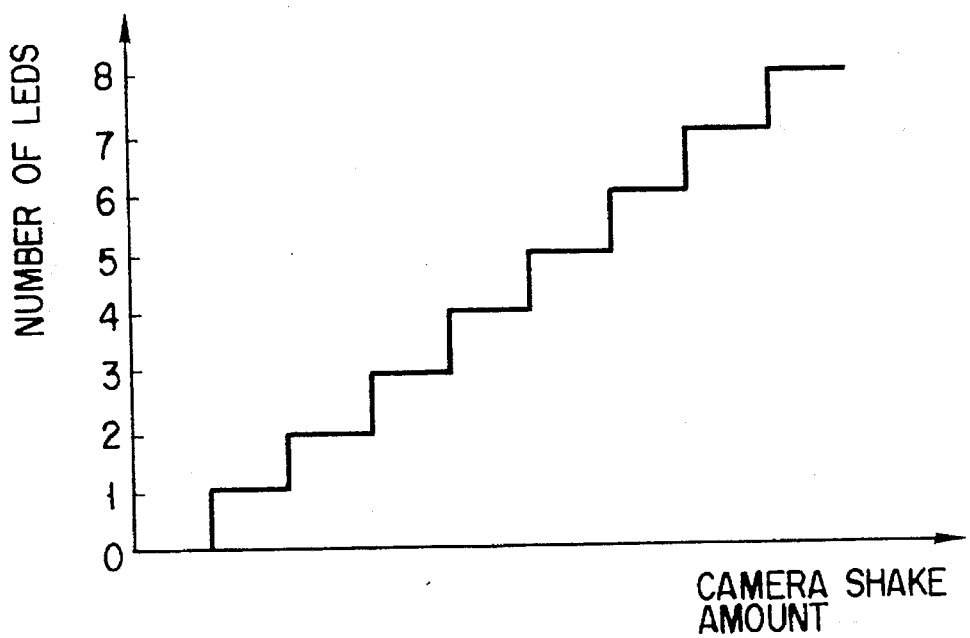
FIG. 8 is a graph showing the relationship between the number of LEDs and the camera shake amount in the case wherein the LEDs shown in FIG. 5A are used.

According to this operation, as shown in FIG. 8, a camera shake amount is converted into lighting of a corresponding number of LEDs. More specifically, when the camera shake amount is large, a large number of LEDs are turned on to emit light in the form of a belt, and a small number of LEDs are turned onto emit light in the form of a belt when the camera shake amount is small. As described above, LCDs may be used in place of the LEDs.

Figure 9:
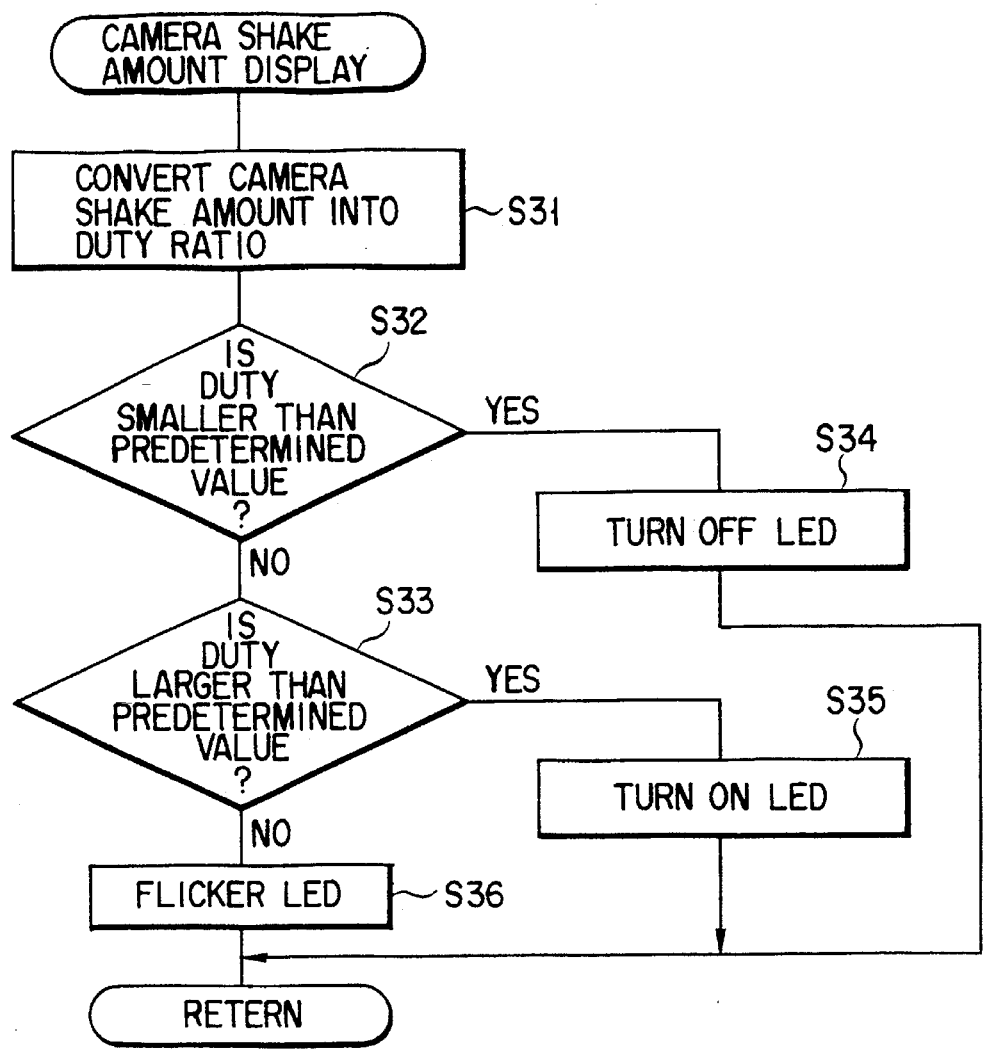
FIG. 9 is a flow chart for explaining a camera shake amount display operation in a case wherein the single LED shown in FIG. 5B is used.

FIG. 9 is a flow chart for explaining a camera shake amount display operation to be performed when the single LED 32b shown in FIG. 5B is used.

In step S31, a camera shake amount is converted into a duty ratio. In steps S32 and S33, the duty ratio is compared with a predetermined value. With this operation, in steps S34, S35, and S36, the LED is turned off, turned on, and flickered.

Figure 10:
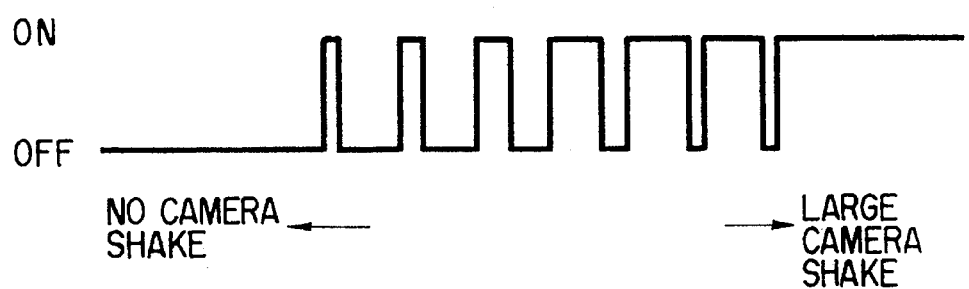
FIG. 10 is a chart showing a change in the duty of an ON operation of the LED with a change in camera shake amount.

That is, as shown in FIG. 10, the duty ratio of the ON operation of the LED is changed with a change in camera shake amount.

Note that the flickering period of the LED may be changed with a change in camera shake amount.

FIG. 11 is a flow chart for explaining a display operation to be performed when the marks $32c_1$ and $32c_2$ shown in FIG. 5C are used.

In step S41, a camera shake amount is converted into a frequency. In steps S42 and S43, the frequency is compared with a predetermined value. With this operation, in steps S44, S45, and S46, the marks $32c_1$ and $32c_2$ are simultaneously turned off, simultaneously turned on, and alternately turned on.

FIGS. 12A and 12B are timing charts showing the ON timings of the marks $32c_1$ and $32c_2$. FIG. 12A shows the ON/OFF timing of the mark $32c_1$. FIG. 12B shows the ON/OFF timing of the mark $32c_2$. With such an alternate display of the marks $32c_1$ and $32c_2$, an image of a camera shake is expressed. That is, the frequency for this alternate display is changed with a change in camera shake amount.

In each case described above, a camera shake amount is informed by means of a visual display. It is, however, apparent that a camera shake amount may be informed by means of a sound by a similar method.

Figure 13:
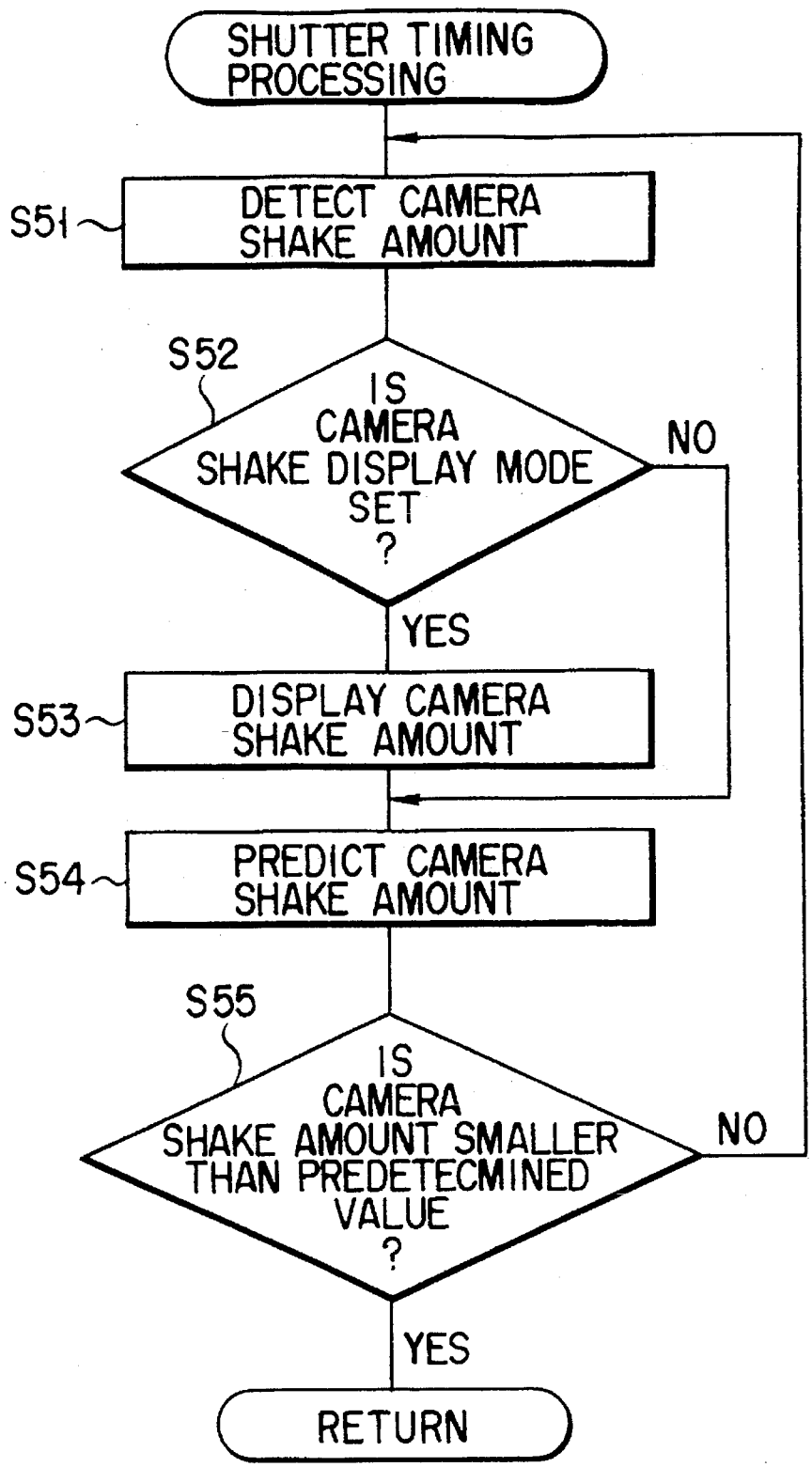
FIG. 13 is a flow chart for explaining an example of shutter timing processing.

FIG. 13 is a flow chart for explaining an example of shutter timing processing.

In step S51, a camera shake amount is detected. In step S52, it is checked whether a display mode selected by the display permission/inhibition switch DSW is set. If it is determined that the camera shake mode is set, a display corresponding to the camera shake amount is performed in step S53.

In step S54, a camera shake amount in a shutter release operation is predicted. In step S55, it is checked whether the camera shake amount is smaller than a predetermined value. If YES in step S55, the processing is terminated, and a shutter driving operation is started.

Since prediction of a camera shake amount in a shutter release operation is disclosed in Jpn. Pat. Appln. KOKAI Publication No. 3-218672 filed by the present applicant, which corresponds to U.S. Pat. No. 5,237,365, a description thereof will be omitted.

Note that in a camera shake reducing means in this embodiment, a shutter timing is adjusted to reduce camera shake, but it is needles to say that any other camera shake reducing means can be used. For example, a means that adjusts an optical axis may be used.

The embodiment shown in FIG. 13 is realized by software. However, the arrangement shown in FIG. 1 may be designed such that a detection result obtained by the camera shake detecting section 12 is displayed on the display section 22 by the mode selecting section 18 even in an exposure operation.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A camera shake amount display apparatus for a camera, comprising:

camera shake detecting means for detecting a camera shake amount of said camera;

shutter timing determining means for determining a shutter release timing of a shutter of said camera on the basis of an output from said camera shake detecting means;

mode input and setting means for inputting an instruction for selecting at least a camera shake learning mode and for setting said camera in a selected mode;

means for preventing an exposure operation on a film in the camera when the camera shake learning mode is selected by said mode input and setting means;

display data converting means for converting the camera shake amount detected by said camera shake detecting means into display data when the camera shake learning mode is selected by said mode input and setting means; and display means for displaying the display data obtained by said display data converting means when the camera shake learning mode is selected.

2. An apparatus according to claim 1, further comprising inhibiting means for inhibiting a determination of a shutter release timing by said shutter timing determining means when the camera shake learning mode is selected by said mode input and setting means.

3. A camera shake display apparatus for a camera, comprising:

camera shake detecting means for detecting a camera shake amount of said camera;

mode setting means for setting at least a camera shake display mode;

control means for receiving outputs from said camera shake detecting means and from said mode setting means, and for converting the camera shake amount detected by said camera shake detecting means into display data and outputting the display data when the camera shake display mode is selected by said mode setting means;

wherein said mode setting means sets the camera shake display mode when a film detecting switch fails to detect that a film is loaded; and display means for receiving the display data output from said control means and displaying the camera shake amount.

4. A camera comprising;

detecting means for detecting a camera shake amount of said camera;

display means for displaying a camera shake state on the basis of the camera shake amount detected by said detecting means;

display selecting means for inhibiting or allowing a display operation of said display means; and means for disabling at least a releasing operation of a camera shutter while the display operation is permitted by said display selecting means.

* * * * *